March 5, 1929.　　　J. T. SIBLEY　　　1,704,632
WINDSHIELD WIPER
Filed June 18, 1925　　　2 Sheets-Sheet 1
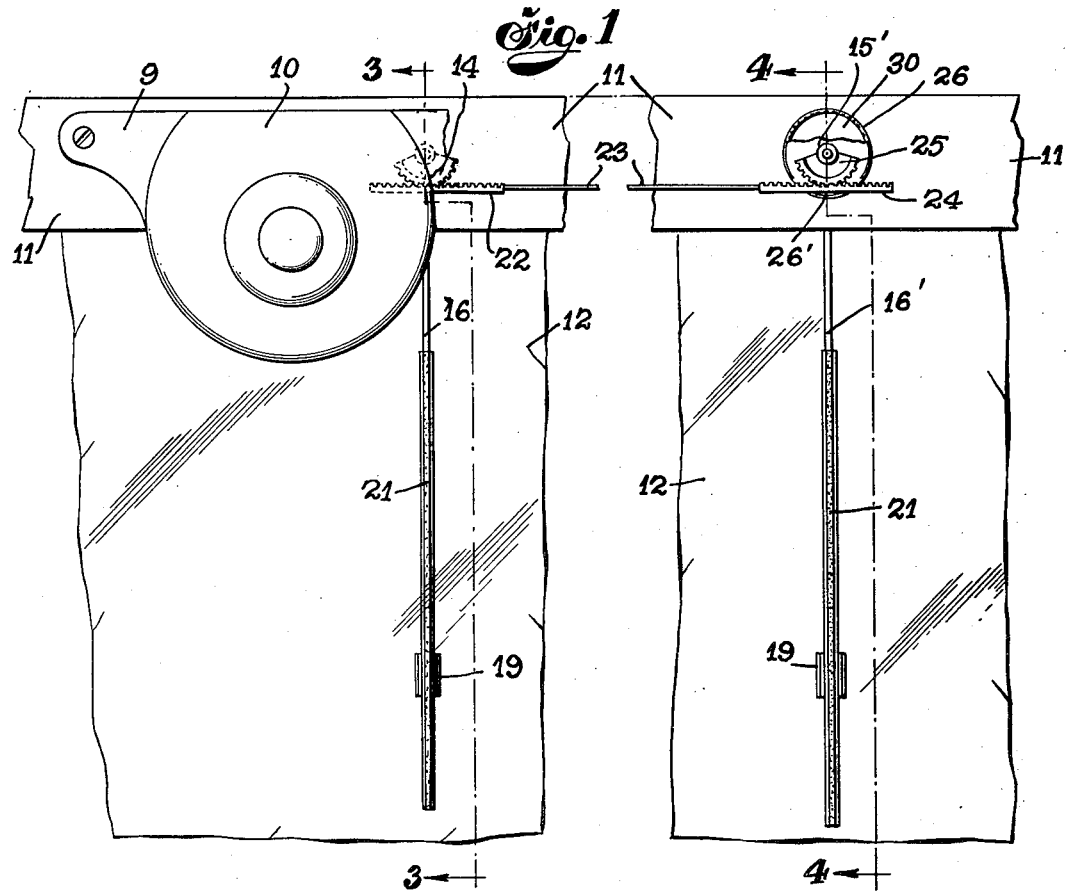
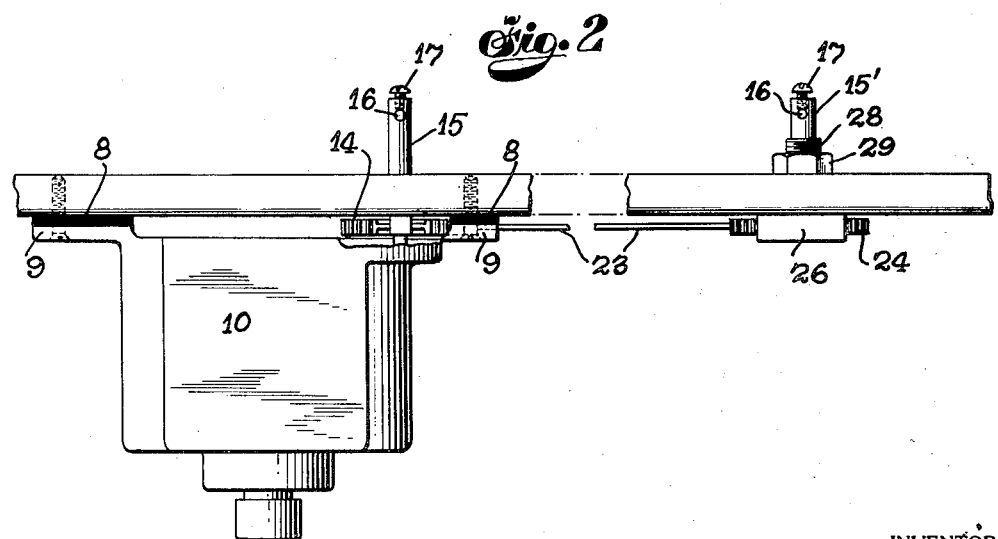
INVENTOR,
James T. Sibley.
BY
Ramsay Hogue
ATTORNEY March 5, 1929.                J. T. SIBLEY                1,704,632
                            WINDSHIELD WIPER
                         Filed June 18, 1925           2 Sheets-Sheet 2
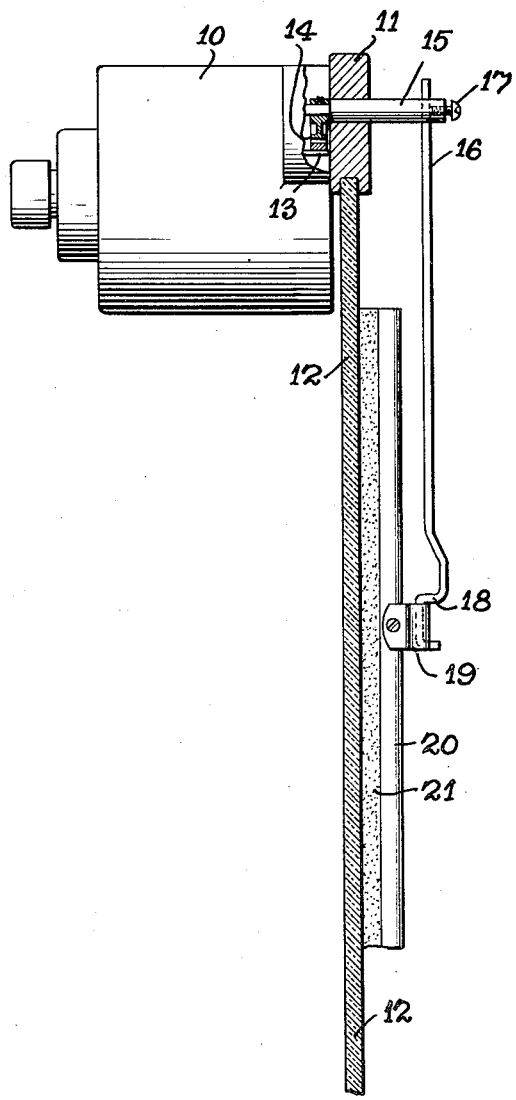
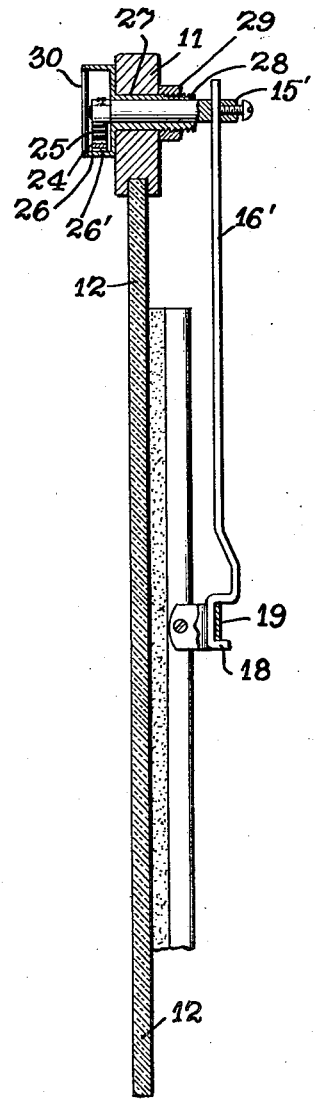
INVENTOR,
James T. Sibley,
BY
Ramsay Hoguet
ATTORNEY Patented Mar. 5, 1929.

1,704,632

UNITED STATES PATENT OFFICE.

JAMES T. SIBLEY, OF NEW YORK, N. Y., ASSIGNOR TO S. & U. HOLDING COMPANY, INC., OF NEW YORK, N. Y., A CORPORATION OF NEW YORK.

WINDSHIELD WIPER.

Application filed June 18, 1925. Serial No. 37,932.

My invention relates to improvements in windshield wipers, and more particularly windshield wipers of the so-called tandem variety, in which a pair of wipers are used to clear different parts of the windshield. The object of my invention is to produce a very simple, inexpensive and efficient means of connecting the second wiper with the driving means of the first, so that the two will work together, and if desired in synchronism. My invention is intended also to produce an efficient and simple means of connecting the two wipers in such a way that the connection can be made without difficulty with the single wiper and its driving mechanism, so as to duplicate the results. My invention is also intended to produce a simple combined housing and hanger for the second wiper, which houses the driving mechanism of said wiper, furnishes a bearing for the shaft, and permits the hanger and housing to be readily attached and tightened so as to avoid rattling. These and other advantages will appear clearly from the description which follows.

Reference is to be had to the accompanying drawings forming a part of this specification, in which similar reference characters indicate corresponding parts in all the views.

Figure 1 is a broken front elevation of the attachments embodying my invention.

Figure 2 is a broken plan view thereof.

Figure 3 is a cross section on the line 3—3 of Figure 1, and

Figure 4 is a cross section on the line 4—4 of Figure 1.

In the drawings I have shown a small motor 10 for driving the wipers, this having legs 9 by which it can be attached to the frame 11 of the windshield 12, and soft washers 8, such as rubber or cork, are inserted between the legs and the windshield frame to prevent vibration. I have shown a segmental pinion 14 on the operating shaft of the first wiper, and this shaft is driven from the motor in a known manner, and as the driving has nothing to do with my present invention, it is not shown. The shaft 15 carries a rod 16 which can be connected simply by extending it through a hole in the shaft and fastening it by a binding screw 17. At its lower end the rod 16 is formed into a generally U-shaped hook 18 which can be engaged in the hollow clip 19 of the wiping element, which in the present instance consists of a back 20 and a rubber brush 21, the wiping element being common in the art. The connection, however, between the clip and the rod 16 is a simple and efficient one. The rod can be introduced into the clip 19 before connecting it on the shaft 15, and the two sides of the U shaped bend serve to position the rod and clip with respect to each other.

The foregoing arrangement is substantially that for operating a single wiper, except that the connection between the rod 16 and the wiper proper is believed to be novel.

If tandem wipers are to be used, a connection is made between the segmental gear 14 and the second wiper, which may conveniently be that shown in the drawings, in which a rack 22 engages the pinion 14 and connects by a rod 23 which can be small and not noticeable, because little power is needed, with a second rack 24 which engages a pinion 25 on the second wiper carrying shaft 15′, which is parallel with the first shaft 15, extends through the frame 11, and carries the second wiper in the same manner that the first wiper is carried as above described.

The pinion 25 is enclosed in a housing 26 which is preferably though not necessarily cylindrical, and has a shank 27 (see Figure 4) extending through the frame 11 of the windshield, this shank serving the double purpose of a bearing for the shaft 15′ and a means for securing the housing 26. To this end the shaft is threaded as shown at 28 to receive a fastening nut 29, and by tightening the nut the housing is bound securely in place so as to prevent rattling, and a simple and cheap bearing is provided for the shaft 15. The housing is provided with a removable cover 30.

It will be noticed that the motor connection with the rack shafts is hidden between the motor and the frame 11, while the rack shaft connection with the shaft 15′ is essentially within the housing 26, and the only noticeable connection is the rod 23 which is small and inconspicuous. In order that the racks 22 and 24 may be supported in place, a stud 13 can be provided on the inner wall of the motor casing, and a stud 26′ in the housing 26.

It will thus be seen that if a car is equipped with a motor and means for driving a single wiper, and it is desired to attach the tandem or second wiper, it is very easily done by simply attaching the second wiper and its combined hanger and housing, and connecting the toothed rack as shown. After the apparatus is installed, the wipers can be used separately or together as desired. If only one wiper is desired, the rack bar is disconnected, and if both are to be used, the connection is made as described, and in this connection it will be understood that the rack bar may be continuous instead of in parts connected by the rod 23, or any other equivalent driving mechanism between the two wiper shafts can be substituted without affecting the invention.

I claim:—

1. In combination, a motor having a driving shaft, a wiper element connected to the motor shaft for direct drive from said shaft, a second wiper element having a shaft mounting spaced from said motor, rigid removable connection directly with the shafts for operation of the wiper elements in unison, the connection movable in a single straight line path, and a housing for the shaft mounting and connection therewith, the housing communicating with the motor casing, the motor and housing acting to support the shafts and forming guides for the connection.

2. In a wind shield wiper, a motor having legs for detachable engagement with the wind shield, one leg being hollow to form a housing, a driving shaft journaled in the hollow leg and operated by the motor, a segmental pinion carried by the shaft within the hollow leg, a wiper element connected directly with the driving shaft, a second wiper element having a shaft mounting spaced from the motor, a segmental pinion on the shaft mounting, and a rigid one piece member having meshing engagement with the pinions for simultaneous operation of both wiper elements.

3. In a wind shield wiper, a motor having legs for detachable engagement with the wind shield, one leg being hollow to form a housing, a driving shaft journaled in the hollow leg and operated by the motor, a segmental pinion carried by the shaft within the hollow leg, a wiper element connected directly with the driving shaft, a second wiper element having a shaft mounting spaced from the motor, a segmental pinion on the shaft mounting, a rigid one piece member having meshing engagement with the pinions for simultaneous operation of both wiper elements, and a housing receiving the shaft mounting and its pinion, the leg of the motor and said housing forming a guide for the member.

4. In a wind shield wiper, a motor having legs for detachable engagement with the wind shield, one leg being hollow to form a housing, a driving shaft journaled in the hollow leg and operated by the motor, a segmental pinion carried by the shaft within the hollow leg, a wiper element connected directly with the driving shaft, a second wiper element having a shaft mounting spaced from the motor, a segmental pinion on the shaft mounting, a rigid one piece member having meshing engagement with the pinions for simultaneous operation of both wiper elements, and a housing receiving the shaft mounting and its pinion, the leg of the motor and said housing forming a guide for the member and permitting quick removal of the latter from engagement with the pinions without the loosening of any parts.

5. In combination, a motor having a driving shaft and an elongated casing communicating with the casing of the motor, a wiper element connected to the motor shaft for direct drive from said shaft, a second wiper element having a shaft mounting spaced from said motor and in said casing, and a rigid removable connection directly between the shafts for operation of the wiper elements in unison, said connection being arranged in said casing.

In testimony whereof, I have signed my name to this specification this 15th day of June, 1925.

JAMES T. SIBLEY.